(12) United States Patent
Atkins

(10) Patent No.: US 6,575,071 B1
(45) Date of Patent: Jun. 10, 2003

(54) PORTABLE SAWING APPARATUS

(75) Inventor: David John Atkins, Longfield (GB)

(73) Assignee: Vestika Oy, Anjalankoski (FI)

( * ) Notice: Subject to any disclaimer, the term of this patent is extended or adjusted under 35 U.S.C. 154(b) by 0 days.

(21) Appl. No.: 09/762,659

(22) PCT Filed: Aug. 12, 1999

(86) PCT No.: PCT/GB99/02660
§ 371 (c)(1),
(2), (4) Date: Mar. 22, 2001

(87) PCT Pub. No.: WO00/09300
PCT Pub. Date: Feb. 24, 2000

(30) Foreign Application Priority Data

Aug. 13, 1998 (GB) .............................. 9817692

(51) Int. Cl.⁷ ............................. B27B 5/18; B26D 5/00; B26D 1/14
(52) U.S. Cl. ........................ 83/745; 83/471.2; 83/483; 83/744; 83/924
(58) Field of Search .................. 83/745, 744, 861, 83/743, 54, 869, 753, 773, 471.2, 483, 924, 661; 30/430, 310, 417; 82/101, 102, 107, 113, 128

(56) References Cited

U.S. PATENT DOCUMENTS

| | | | | |
|---|---|---|---|---|
| 1,758,729 A | * | 5/1930 | Wilson | 82/47 |
| 3,161,097 A | * | 12/1964 | Judelson | 82/48 |
| 3,208,320 A | | 9/1965 | Andersen | |
| 3,291,166 A | * | 12/1966 | Mayo | 83/473 |
| 3,661,043 A | * | 5/1972 | Voigt | 82/101 |
| 4,172,399 A | * | 10/1979 | Hillesheimer | 279/110 |
| 4,269,091 A | * | 5/1981 | Hodapp et al. | 82/101 |
| 4,744,123 A | * | 5/1988 | Le Testu et al. | 15/104.04 |
| 4,864,906 A | * | 9/1989 | Hall | 83/371 |
| 5,038,473 A | | 8/1991 | Bradley | |
| 5,060,456 A | * | 10/1991 | Wehrli | 53/381.2 |
| 5,185,928 A | * | 2/1993 | Martin et al. | 30/92.5 |
| 5,203,244 A | | 4/1993 | Guigon et al. | |
| 5,299,552 A | * | 4/1994 | Kubo | 125/21 |
| 5,913,489 A | * | 6/1999 | Rodriquez et al. | 242/526.2 |
| 6,269,719 B1 | * | 8/2001 | Easton et al. | 83/54 |

FOREIGN PATENT DOCUMENTS

| | | |
|---|---|---|
| DE | 399 073 | 5/1922 |
| DE | 399 073 C | 7/1924 |
| DE | 38 02 582 A | 8/1989 |
| DE | 38 02 582 A1 | 8/1989 |
| DE | 312 842 C | 6/1999 |
| EP | 0 498 691 A | 8/1992 |
| EP | 2 682 314 | 4/1993 |
| FR | 2 682 314 A | 4/1993 |

* cited by examiner

*Primary Examiner*—Allan N. Shoap
*Assistant Examiner*—Isaac N Hamilton
(74) *Attorney, Agent, or Firm*—Weingarten, Schurgin, Gagnebin & Lebovici LLP

(57) ABSTRACT

Paper handling apparatus, used in particular for sawing reels of paper, having a saw blade mountable on a carriage slide, a saw drive motor to drive the saw blade, a mechanism for mounting the carriage slide onto an object to be sawn, and a mechanism for moving the carriage slide across the surface of the object to be sawn so as to bring the saw blade into contact with the object to be sawn. The apparatus is suitable for cutting sheet material rolled around a cylindrical core and, due to its size and structure, can be transported to the object to be sawn and attached thereon.

15 Claims, 2 Drawing Sheets

PORTABLE SAWING APPARATUS

The present invention relates to paper handling apparatus, in particular to a portable sawing apparatus, and more specifically to sawing apparatus that is mountable upon a reel, for example a reel of paper.

When the large industrial paper reels are produced either in the wrong size or subsequently become redundant, or when ends of the reels are damaged they need to be re-sized before being accepted by the printing industry. There are generally two methods of such treatment currently carried out in the paper industry. These take the form of "rewinding" and "sawing". Paper reels are generally cylindrical in shape and the areas that often may require treatment are the planar end faces of the reel.

The most conventional treatment process involves rewinding. As its name suggests, the process involves the rewinding of the parent paper reel, through a mechanism of rider rolls and drive drums to form a new "rewound" reel of paper. With this process the reel diameter is able to be changed and also there is the ability to slit multiple reels. There are, however, several disadvantages to the rewinding process. A high level of infrastructure is required, and as a result, the equipment is very expensive and requires skilled operators to operate the machinery at the required efficiency. Rewinding also has been shown to change the original mill tension and therefore can place excessive tensile pressure on the reel which can lead to fracturing of the fibre in the paper, or web breaks during printing.

Furthermore, due to the size and complexity of the equipment required, the rewinding process must be carried out at a fixed location, wherein the paper reels must be brought to the rewinding site in order to be treated under the process. The width of the paper reels can vary from 0.5 m to 3 m with an outer diameter of up to 1.8 m. Amongst other disadvantages, this vastly increases the costs involved with the process with large transportation and storage costs being a major contributing factor. Also, throughout the industry, a stigma is attached to rewound reels, as the receiver of such reels knows that they are not in the original condition that they were in prior to undergoing the rewinding process.

A more recent method of paper reel treatment involves sawing of the paper reels to take off damaged material. Unlike rewinding, the process of sawing does not have a stigma attached to it within the industry, mainly because the original mill tension is not affected during the process.

In the majority of current sawing methods, the paper reel itself is laid on its side as it passes through the sawing machinery. The speed of operation is greatly increased while the ability to slit multiple reels is also maintained. Furthermore, only semi-skilled operators are needed to operate the required machinery.

The machinery itself however has several disadvantages, being similar to that for rewinding, in that a high level of infrastructure is required, resulting in high cost and fixed location. Reel diameters cannot be changed and any out-of-shape reels cannot be sawn, through the process. Furthermore, the quality of the sawn reels, using this horizontal sawing process, is generally not good enough to be accepted by the printing industry directly. The process must therefore be followed by a rewinding process in order to bring the reels up to the correct standard for acceptance.

Another method of paper reel sawing involves the paper reel being placed in an upright position within the apparatus. This method provides greater mobility and also produces sawn reels of the required quality for acceptance by the printers. The vertical sawing apparatus is mobile, but its size is such that large specialised vehicles are needed in order to transport it from one site to another. The size also means that a substantial amount of time, in excess of two hours, is required to set up the apparatus for use, and to dismantle the apparatus fo transportation. As a result, the use of the vertical sawing method is only available to customers who have a high level of infrastructure to accommodate the method and its related apparatus. Furthermore, the efficiency of the method is dependent on the co-operation of third party truck drivers used for the transportation of the machinery.

An aim of the present invention is to provide sawing apparatus that overcomes or at least alleviates these problems, by providing apparatus that is easily portable from site to site without the need for specialised transportation requirements.

Accordingly, the present invention provides a portable sawing device comprising a saw blade mountable on a carriage slide, a saw drive motor to drive the saw blade, means for mounting the carriage slide on to an object to be sawn, and means for moving the carriage slide across the surface of the object to be sawn so as to bring the saw blade into contact with the object to be sawn.

The sawing apparatus is most suitable to cutting sheet material rolled around a cylindrical core. For the purposes of the description, this object to be cut be exemplified by a reel of paper, although it will be appreciated that the invention is also applicable to other material. Industrial paper reels are produced in width sizes ranging from 0.5 m to 3 m with an outer diameter of up to 1.8 m and their weights range from 500 kgs to in excess of 3,000 kg. These dimensions make transportation of the reels to and from the sawing site costly and time consuming. The vertical sawing "mobile" apparatus is able to be transported from site to site, however its complex infrastructure, size and weight (around 6,000 kg) is such that transportation to the paper reel storage site, as opposed to the transportation of paper reels to the sawing site, is inefficient. The size and structure of the apparatus of the present invention, however, is such that it weighs considerably less than the fixed or mobile apparatus described above. As a result the apparatus is "portable" in that it is more efficient to transport the sawing apparatus to the paper reel site, as opposed to transporting the paper reels to the sawing site. This significantly reduces transportation costs associated with the sawing process.

The saw blade is preferably cylindrical although it can be envisaged that the saw blade is linear and undergoes a reciprocating action.

The object to be sawn preferably takes the form of a sheet material rolled around a cylindrical core, for example a reel of paper.

Preferably the fixing means comprises an air shaft which is inserted into the central core of the reel of paper.

The reel of paper may be fixed and freestanding, requiring no specialist support, or alternatively it may be mounted on a rotatable base, the reel of paper thus rotating when the base is in rotation.

The carriage moving means preferably comprises a motor for rotating the carriage slide over a proximal, planar, end face of the reel of paper, together with a further motor for moving the carriage across the face of the reel of paper.

Opposing taper ball bearings and a cam mechanism enabling alteration of the angle between the carriage slide and the paper reel may be provided within the carriage slide together with a indicator mounted on the carriage slide to indicate when the carriage slide is parallel with the top surface of the paper reel.

An embodiment of the present invention will now be described with reference to the accompanying drawings in which.

Figure 1:
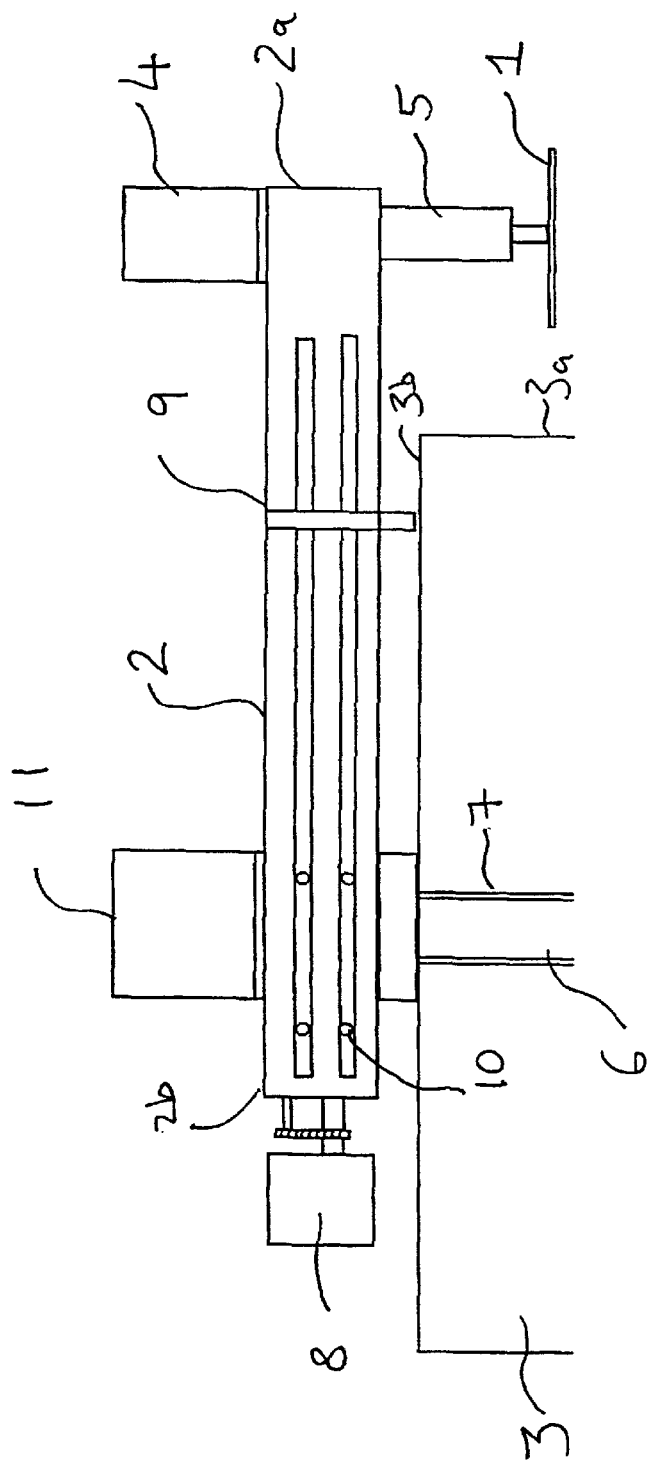
FIG. 1 is a side view of the sawing apparatus.

Refering to the Figures, the sawing apparatus comprises a circular saw blade 1 adjustably attached to a carriage slide 2 which is mountable on the planar, top surface 3b of a cylindrical paper reel 3 to undergo the sawing process. The paper reel 3 stands fixedly, with its axis substantially vertical. In the embodiment hereinafter described, the paper reel has a diameter of 1500 mm. The saw blade 1 is preferably of 305 mm diameter and is rotated via a circular saw drive 4 mounted on one end 2a of the carriage slide 2. The saw 1 is attached to an adjustable slide member 5 that is mounted on, and protrudes from, the underside of the end of the carriage slide 2. The slide member 5 is moveable with respect to the carriage slide 2 so to adjust the height at which the saw blade1 penetrates the outer cylindrical surface 3a of the paper reel. The carriage slide 2 is mounted, near its other end 2b, to an air shaft 6 protuding perpendicularly down from the carriage slide 2. The air shaft 6 has a diameter that is expandable to the inner diameter of a core 7 around which the paper is formed, such that, when the air shaft 6 is placed within the core 7 and expands, it fixedly mounts the carriage slide 2, and all the attachments thereto, on the top surface 3b of the paper reel 3.

The carriage slide 2 is able to slide along the diameter of the surface 3b of the paper reel 3 such that the saw blade 1 comes into contact with the outer surface 3a of the paper reel and, when the saw blade is in rotation, cuts into the outer surface 3a. A motor 8, situated on the end 2b of the carriage slide 2, provides the power in order to slide the carriage slide along the surface 3b of the paper reel.

A indicator 9 is attached to the carriage slide 2 so to indicate when the carriage slide is adjusted to be parallel to the proximal surface 3b of the paper reel 3. To this end, a plurality of opposing taper ball bearings 10 and associated cam mechanism (not shown) are situated within the carriage slide 2 so to adjust the angle between the carriage slide 2 and the paper reel surface 3b. As a result of making the carriage slide 2 angle towards, or away from, the paper reel surface 3b, the saw blade 1 is able to cut the outer surface 3a of the paper reel 3 at a pre-determined angle, usually so as to leave the end surface 3b substantially, perpendicular to the vertical axis of the reel 3.

A further motor 11 is attached to the carriage slide 2 so as to provide rotation of the carriage slide 2 over the entire area of the paper reel surface 3b. As a result, the saw blade 1, attached to the end 2a of the carriage slide 2 is able to cut the entire outer surface of the entire circumference of the paper reel 3.

Figure 2:
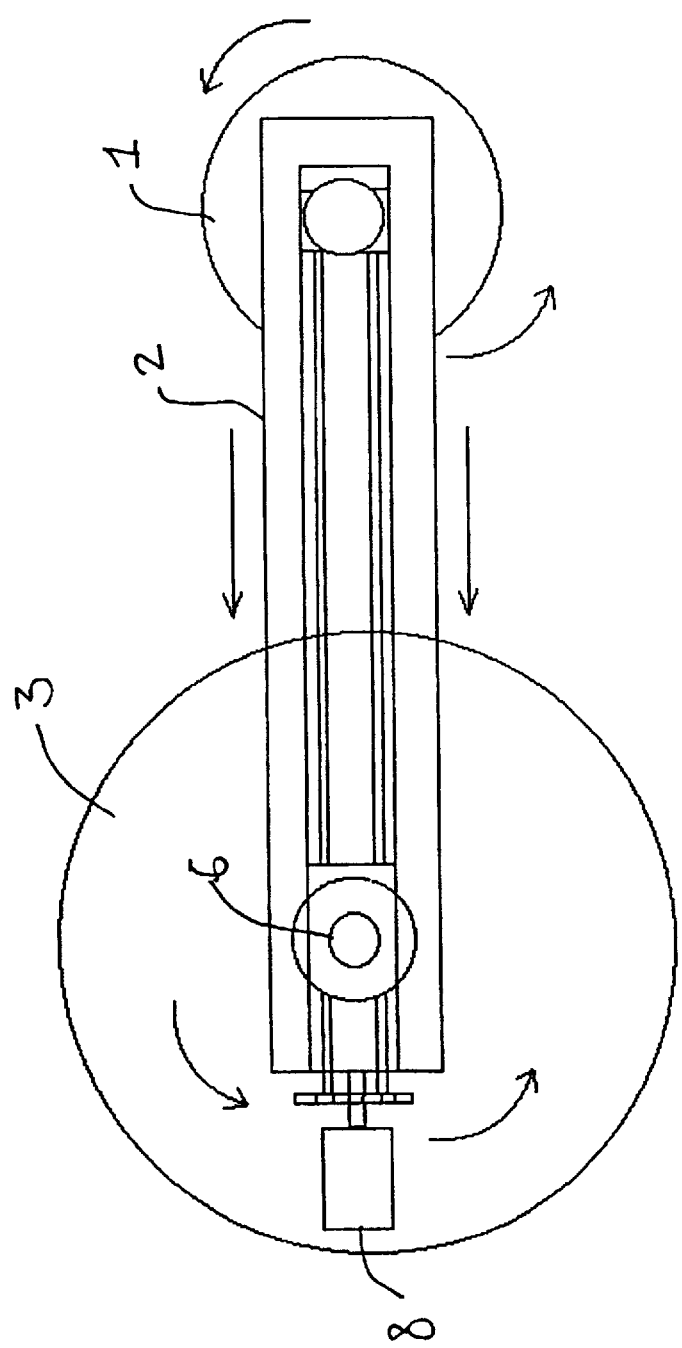
FIG. 2 is a plan view of the sawing apparatus of FIG. 1.

In use, air shaft 6 is inserted into the core 7 so as to mount the sawing apparatus on to the paper reel 3. Using the plurality of motors, several different axial movements are available, each can be seen clearly in FIG. 2, by the arrows showing the directional movement of each mechanism within the overall structure. The carriage slide 2 is rotated around the top surface 3b of the paper reel 3, usually in a clockwise direction, via the motor 11. The saw blade 1 is rotated via the circular saw drive motor 4. Finally, the carriage slide 2 is able to slide across the paper surface 3b via the motor 8.

The saw blade 1 is therefore able to cut into the outer surface 3a of the paper reel 3 at a variety of positions determined by the various motors providing movement to the carriage slide 2. The height of the cut is determined by the movement of the adjustable slide member 5 transversely of the carriage slide 2. The depth of the cutting is determined by the sliding movement of the slide carriage 2 over the paper surface 3b. The depth of the cut is however limited to the radius of the saw blade 1 itself. The operator may then remove the entire cut outer layer 3b of the paper reel 3 by hand. Whereupon the sawing process is continued. These steps may need to be repeated, depending on the relative dimensions of the saw blade 1 and the reel 3.

The motors can be either hydraulically or pneumatically driven.

Although the present invention refers to the paper reel as being up standing in a vertical position, it is appreciated that the paper reel can be laid "on its side" in a horizontal position during the cutting process.

What is claimed is:

1. Portable sawing apparatus comprising a circular saw blade mountable on a carriage slide, the carriage slide being mountable on an expandable air shaft, the expandable air shaft being insertable into a core of an object to be sawn having a longitudinal axis and which is expandable therein to fixedly mount the portable sawing apparatus onto the object to be sawn, a saw drive motor to drive the circular saw blade, and means for moving the carriage slide across a surface of the object to be sawn so as to bring the circular saw blade into contact with the object to be sawn in a direction substantially perpendicular to the longitudinal axis of the object.

2. Portable sawing apparatus according to claim 1, wherein the carriage slide moving means comprises a motor.

3. Portable sawing apparatus according to claim 2, wherein the carriage slide motor is mounted on the air shaft.

4. Portable sawing apparatus according to claim 1, wherein the saw drive motor is mounted on the air shaft.

5. Portable sawing apparatus according to claim 1, wherein the object to be sawn is substantially cylindrical and wherein an end, substantially planar, face thereof comprises said surface of the object to be sawn, and wherein the carriage slide moving means comprises a further motor for rotating the carriage slide over the end planar surface of the object.

6. Portable sawing apparatus according to claim 1, comprising means for enabling alteration of the angle between the carriage slide and the object to be sawn, thereby to adjust the angle of a saw cut.

7. Portable sawing apparatus according to claim 6, wherein the enabling means comprises a plurality of bearings and a cam mechanism within the carriage slide.

8. Portable sawing apparatus according to claim 1, comprising an indicator mounted on the carriage slide to indicate when the carriage slide is parallel with the surface of the object to be sawn.

9. Portable sawing apparatus according to claim 1, wherein said portable sawing apparatus is mounted on an object to be sawn.

10. Portable sawing apparatus according to claim 9, wherein said object to be sawn comprises sheet material rolled around a cylindrical core.

11. Portable sawing apparatus according to claim 9, wherein said portable sawing apparatus is mounted on an object to be sawn comprising a reel of paper.

12. Portable sawing apparatus according to claim 2, wherein:

the carriage slide moving means comprises a further motor for rotating the carriage slide over the surface of the objects so as to move the circular saw blade therearound;

means are provided for enabling alteration of the angle between the carriage slide and the object to be sawn, thereby to adjust the angle of a cut to be made by the circular saw blade;

the enabling means comprises a plurality of bearings and a cam mechanism within the carriage slide;

an indicator is mounted on the carriage slide to indicate when the carriage slide is parallel with the surface of the object to be sawn.

13. Portable sawing apparatus according to claim 12, further comprising an object to be sawn mounted thereon.

14. Portable sawing apparatus according to claim 13, wherein said object to be sawn comprises sheet material rolled around a cylindrical core.

15. Portable sawing apparatus according to claim 13, wherein said object to be sawn comprises a reel of paper.

* * * * *